(12) United States Patent
Rubin

(10) Patent No.: US 8,625,236 B2
(45) Date of Patent: Jan. 7, 2014

(54) PATTERNED STORAGE MEDIUM

(75) Inventor: Kurt A. Rubin, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/435,849

(22) Filed: Mar. 30, 2012

(65) Prior Publication Data

US 2013/0258518 A1  Oct. 3, 2013

(51) Int. Cl.
    *G11B 5/82*  (2006.01)
(52) U.S. Cl.
    USPC .......................................................... 360/135
(58) Field of Classification Search
    USPC .......................................................... 360/135
    See application file for complete search history.

(56) References Cited

U.S. PATENT DOCUMENTS

| | | | |
|---|---|---|---|
| 7,112,377 B2 | 9/2006 | Itoh et al. | |
| 7,494,727 B2 | 2/2009 | Suwa et al. | |
| 7,741,229 B2 | 6/2010 | Suwa et al. | |
| 7,941,911 B2 | 5/2011 | Bandic et al. | |
| 7,986,493 B2 | 7/2011 | Weller et al. | |
| 8,168,311 B2* | 5/2012 | Mate et al. | 428/833 |
| 2005/0199581 A1 | 9/2005 | Suwa et al. | |
| 2006/0292400 A1 | 12/2006 | Suwa et al. | |
| 2009/0067093 A1* | 3/2009 | Haginoya et al. | 360/234.3 |
| 2010/0033872 A1 | 2/2010 | Xi et al. | |
| 2010/0062282 A1 | 3/2010 | Yen et al. | |
| 2010/0227202 A1 | 9/2010 | Gao et al. | |
| 2010/0323223 A1 | 12/2010 | Mabuchi et al. | |
| 2011/0244273 A1* | 10/2011 | Mate et al. | 428/846.6 |

FOREIGN PATENT DOCUMENTS

JP  2239426 A  9/1990

* cited by examiner

*Primary Examiner* — Allen T Cao
(74) *Attorney, Agent, or Firm* — Kunzler Law Group, PC

(57) ABSTRACT

According to one embodiment, a patterned medium is disclosed herein. The patterned medium includes a patterned layer, a stop layer, and a fill layer. The patterned layer includes plurality of grooves. The stop layer is positioned on the patterned layer. The stop layer is at least partially positioned within the plurality of grooves and a portion of the stop layer may be positioned on walls of the grooves of the patterned layer. The fill layer is at least partially positioned within the grooves between portions of the stop layer. The stop layer substantially separates the fill layer from the patterned layer.

15 Claims, 7 Drawing Sheets

PATTERNED STORAGE MEDIUM

TECHNICAL FIELD

This disclosure relates to storage media, and more specifically to physical features in bit-patterned magnetic storage media.

BACKGROUND

Generally, hard-disk drives have rotating high precision disks that are coated on both sides with a special thin film media designed to store information in the form of magnetic patterns. In bit-patterned, hard-disk drives, the special thin film media has been patterned to form a large number of individual storage elements that can retain a magnetic orientation and thereby store data. Electromagnetic read/write heads "flying" on a cushion of air only fractions of microinches above the disk are used to record information onto the thin film media or read information from the media. Read/write heads may write information to the disk by creating an electromagnetic field to orient magnetic grains of a storage element in one direction or the other. Each grain acts as a magnetic dipole pointing in a certain direction and creating a magnetic field around the grain. All of the grains in a storage element will typically point in the same direction so that the storage element as a whole has an associated magnetic field. Read/write heads may read information from the disk by sensing the direction of a magnetic field associated with the storage elements.

Because read/write heads are used to sense and orient the magnetic fields of a storage element, proximity of the read/write heads can be quite important. For example, when the read/write heads are located closer to a storage element, it may be possible to more accurately and efficiently write to or read from the storage element, which can lead to better hard-disk drive performance in the form of speed and efficiency. Further, increased proximity between read/write heads and storage elements can even lead to better data retention and a reduced likelihood of data corruption because the magnitude of the static magnetic fields necessary for reading and the magnitude of the induced magnetic fields for writing may be reduced. The reduced magnitudes may lead to less detrimental interaction between a storage element and a magnetic field induced by the read/write head and/or nearby storage elements.

While it may be desirable to have the read/write head as close to the storage elements as possible, it may also be undesirable that the read/write head contact the thin film medium. For example, contact between the read/write head and the thin film medium can damage the storage elements and cause the contacted portion to become inoperable. Thus, it is important to balance proximity of the read/write head with the risk of the read/write head contacting the thin film medium.

Two major aspects of the design of thin film media can lead to increased proximity between a read/write head and the storage elements. A first aspect is the thickness of the intervening layers between a surface of the thin film medium and the magnetic region of a magnetic storage element. Reduced overall thickness of these intervening layers can allow a read/write head to be closer to the magnetic region. A second aspect is the planarity of the surface of the thin film medium. Generally, the more planar or smooth the thin film medium is, the closer the read/write head can be to the storage elements because the lower the risk of the head contacting the surface of the medium. Because the patterning of a thin film can, in some embodiments, lead to bumps or other surface features on the thin film, this can be an important consideration.

Additionally, manufacturing of patterned features on the thin film can be quite complicated and involve multiple steps which may include forming multiple layers, etching one or more layers, planarizing, or other steps. Each step adds to the complexity which increases cost, risk of failure, and/or other problems. Thus, reducing the number of layers or fabrication steps may reduce the cost of fabricating a storage medium. This reduction of layers and manufacturing complexity must be balanced with the desired quality and density of magnetic storage.

SUMMARY

The subject matter of the present application has been developed in response to the present state of the art, and in particular, in response to the problems and needs in the art that have not yet been fully solved by currently available patterned magnetic storage media and/or methods of forming patterned magnetic storage media.

According to one embodiment, a patterned medium is disclosed. The patterned medium may include a patterned layer, a stop layer, and a fill layer. The patterned layer may include a plurality of grooves. The stop layer may be positioned on the patterned layer. The stop layer may be at least partially positioned within the plurality of grooves and a portion of the stop layer may be positioned on walls of the grooves of the patterned layer. The fill layer may be at least partially positioned within the grooves between portions of the stop layer. The stop layer may substantially separate the fill layer from the patterned layer.

In one embodiment, the patterned layer includes a plurality of magnetic regions laterally adjacent the plurality of grooves. In a further embodiment, the fill layer forms a plurality of non-magnetic regions laterally adjacent the magnetic regions. In yet another embodiment, the medium further includes a lubrication layer disposed on the stop layer.

In one embodiment, the distance between the top of the magnetic layer and the lubricant is no more than about 1 nm. In a further embodiment, the stop layer is disposed on top of the magnetic regions and laterally between the magnetic regions and the non-magnetic regions. In yet another embodiment, the stop layer substantially forms a barrier between the magnetic layer and any subsequent layers. In one embodiment, the distance between the magnetic regions and the lubrication layer is in the range of about 0 nm to about 3 nm. In another embodiment, the distance between the patterned layer and the lubrication layer is in the range of about 0 nm to about 1 nm. In a further embodiment, the lubricant is deposited substantially directly on top of the magnetic regions and the fill layer. In one embodiment, a top of the fill layer is no more than 2 nm above a top of the stop layer and no more than 6 nm below the top of the stop layer. In a further embodiment, a top of the fill layer is no more than 1 nm above a top of the stop layer and no more than 4 nm below the top of the stop layer.

In one embodiment, the stop layer includes a single layer extending over substantially the entire surface of the patterned layer. In another embodiment, the fill layer is made from a material comprising aluminum and oxygen. In a further embodiment, the fill layer is made from a material having a composition AlOx, where x is in the range of 1 to 2. In yet another embodiment, the fill layer is made from a material including titanium and nitrogen. In one embodiment, the fill layer is made from a material including tantalum and nitrogen. In a further embodiment, the fill layer is made from a material comprising titanium, tantalum, and nitrogen. In one embodiment, the stop layer substantially forms a barrier between the magnetic layer and any subsequent layers.

According to one embodiment, a method for fabricating and/or patterning a magnetic storage medium is disclosed herein. A method for fabricating a magnetic storage medium may include depositing a stop layer directly on a patterned magnetic layer that has one or more grooves. At least a portion of the stop layer is positioned within the one or more grooves. The method may include depositing a fill layer. The fill layer may be deposited directly onto the deposited stop layer and at least partially within the one or more grooves. The method may further include planarizing the fill layer down to the stop layer using a wet etching technique.

According to another embodiment, the wet etching technique may include a chemical mechanical planarization (CMP) process. In one embodiment, the patterned magnetic layer includes a number of magnetic regions adjacent the grooves. In one embodiment, planarizing the fill layer includes removing substantially all fill layer that lies 2 nm or more above the stop layer. In one embodiment, planarizing the fill layer includes removing substantially all of the fill layer that lies above the stop layer.

In one embodiment, the fill layer is made from a material including aluminum and oxygen. In another embodiment, the fill layer is made from a material including titanium and nitrogen. In a further embodiment, the fill layer is made from a material including tantalum and nitrogen. In yet another embodiment, embodiment, the fill layer is made from a material including titanium, tantalum, and nitrogen.

In a further embodiment, the method further includes planarizing a portion of the top layer using a wet etching technique. In one embodiment, planarizing the fill layer includes using a first chemical-mechanical planarization (CMP) and planarizing the portion of the deposited stop layer includes using a second chemical-mechanical planarization (CMP). In one embodiment, the first chemical mechanical planarization includes use of a first slurry and the second chemical mechanical planarization includes use of a second slurry different from the first slurry. In another embodiment, the stop layer includes a single layer extending over substantially the entire surface of the magnetic layer.

In one embodiment, each of the grooves includes a sidewall surface and a base surface. In a further embodiment, depositing the stop layer includes depositing the stop layer on the sidewall surface and base surface of the one or more grooves of the etched magnetic layer.

In a further embodiment, the method further includes depositing a lubricant onto an outermost surface of the magnetic storage medium. In one embodiment, depositing the lubrication includes depositing the lubricant directly on top of the stop layer and fill layer. In another embodiment, depositing the lubricant includes depositing the lubricant directly on top of the stop layer, the etched magnetic layer, and the fill layer. In one embodiment, one or more of depositing the stop layer and depositing the fill layer includes using a vacuum-based deposition technique. The vacuum-based technique may include sputter deposition, magnetron sputtering, facing target-sputtering, or cathodic arc deposition. In another embodiment, the method does not include a deposition step between depositing the fill layer and planarizing the fill layer down to the stop layer. In one embodiment, the method does not include depositing an overcoat layer.

According to one embodiment, a magnetic disk drive system is disclosed. The system may include a controller module, a suspension arm, a read/write head, and a magnetic storage disk. The magnetic storage disk may include an etched magnetic layer, a stop layer, and a lubrication layer. The etched magnetic layer includes a plurality of magnetic regions and non-magnetic regions. The magnetic regions may be laterally adjacent a non-magnetic region. The stop layer may be disposed between the magnetic regions and the non-magnetic regions. The stop layer may substantially separate the non-magnetic regions from the magnetic regions. The distance between the magnetic layer and the lubrication layer may be no more than about 3 nm.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
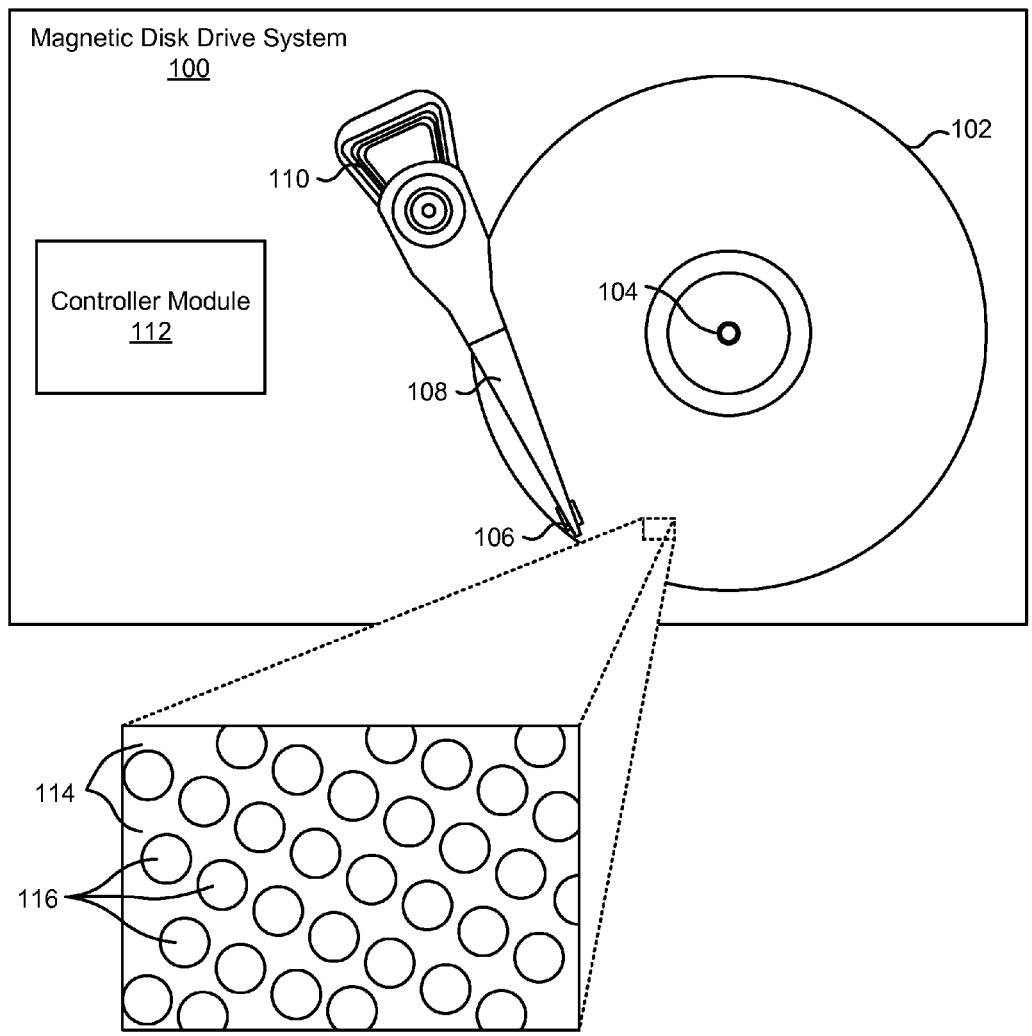
FIG. 1 is a schematic illustration of one embodiment of magnetic disk drive system.

FIG. 1 is a schematic diagram illustrating one embodiment of a magnetic disk drive system 100. In the depicted embodiment, the magnetic disk drive system 100 includes a magnetic storage disk or disks 102, a spindle 104, a read/write head 106, a suspension arm 108, an arm actuator 110, and a controller module 112.

The disk 102 can be defined as a magnetic storage medium that includes magnetic material for magnetically storing information. The spindle 104 allows the disk 102 to rotate about an axis defined by the spindle 104. The read/write head 106 is mounted on the suspension arm 108, which is connected to the arm actuator 110. The arm actuator 110 actuates the position of the suspension arm 108 and, in conjunction with the rotation of the disk 102 about the spindle 104, physically actuates the location of the read/write head 106 in relation to the surface of the disk 102. In a write mode, the read/write head 106 induces a magnetic field that changes the magnetic orientation of a portion of the disk 102. In a read mode, the read/write head 106 reads information from the disk 102 by measuring or sensing an orientation of the magnetic fields of different portions of the storage media. The controller module 112 controls the arm actuator 110, the read/write head 106, and the rotational speed and position of the disk 102 to perform reading, writing, and other operations.

In one embodiment, the disk 102 includes a rigid substrate and storage elements for magnetically recording and/or storing data. The storage elements may be near a surface of the disk 102 such that the information stored by the elements can be read or information can be written to the elements by the read/write head 106. In one embodiment, the storage elements include a plurality of magnetic regions 116 defined between one or more non-magnetic regions 114. The magnetic regions 116 may also be referred to herein as lands or islands. The disk 102 with a pattern of magnetic and non-magnetic regions 116, 114 may be referred to as a bit-patterned medium.

In the depicted embodiment, the magnetic regions 116 are formed so that they are laterally separated by non-magnetic regions 114. In one embodiment, laterally separated is given to mean that the regions 116, 114 are separated in a direction substantially parallel to a surface of a surface of the disk 102. Each magnetic region 116 may be defined by the non-magnetic regions 114 which may form a boundary. The non-magnetic region 114 may separate nearby magnetic regions 116 into independent magnetic areas, each capable of storing a single bit of data storage. For example, if the material (e.g., grains) of region 116 is magnetically oriented in a first general direction, the magnetic disk drive system 100 may read that bit as a zero '0'. In contrast, if the material of the region 116 is magnetically oriented in a second general direction generally opposite the first general direction, the magnetic disk drive system 100 may read the bit as '1'. In another embodiment, a magnetic field that switches between magnetic regions 116 may be read as a '1' while a magnetic field that remains the same between magnetic regions may be read as a '0'.

In one embodiment, the magnetic grains of each of the magnetic regions 116 are oriented in a direction perpendicular to the surface of the disk 102. In another embodiment, the magnetic grains of each of the magnetic regions 116 may be oriented parallel to the surface of the disk. In varying embodiments, the magnetic grains of each of the magnetic regions 116 may be magnetically oriented in a direction perpendicular or parallel to a surface of the disk 102. The non-magnetic regions 114 may be non-magnetic or substantially non-magnetic such that little or no magnetization may be written in the non-magnetic region, or little or no magnetic field may be read from the non-magnetic region 114.

Although FIG. 1 illustrates one embodiment of a magnetic disk drive system 100, it is important to note that the present disclosure may be applicable to any type of magnetic storage media. For example, the teaching disclosed herein may be applicable to magnetic tape drives or any other magnetic storage system. Additionally, the principles here also apply to semiconductor logic and non-magnetic storage media, in some embodiments. For example, features in semiconductor logic and/or non-magnetic storage media may be formed using one of the stop layers and/or fill layers within a groove or other feature between one or more magnetic regions 114 (lands or islands), as disclosed herein. Although focus in the present disclosure is on magnetic disk drive systems, this is by way of illustration and not limitation.

Figure 2:
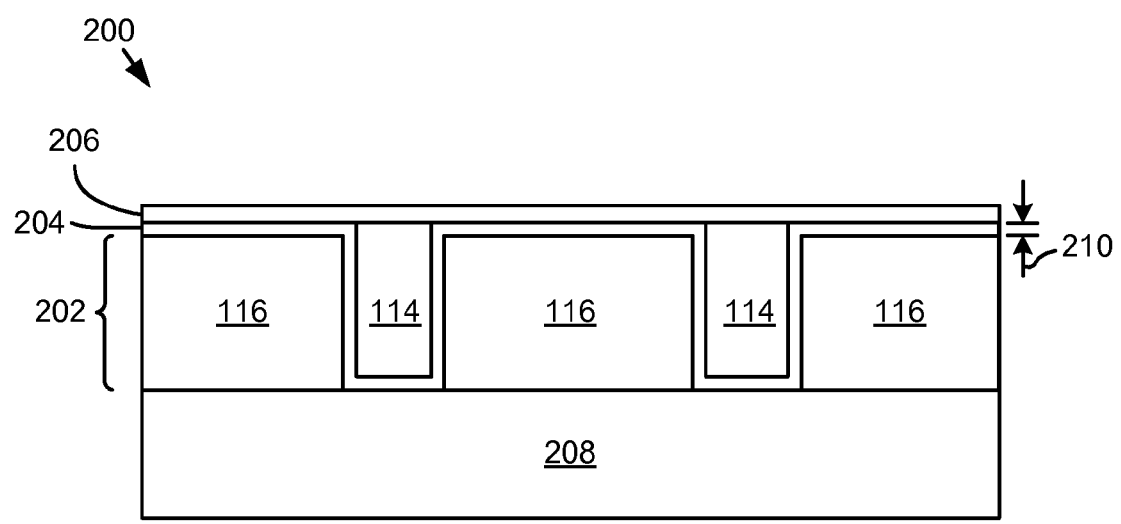
FIG. 2 is a schematic cross-sectional side view of a portion of a patterned magnetic storage medium according to one embodiment.

FIG. 2 is a schematic diagram illustrating a cross-sectional structure of one embodiment of a magnetic storage medium 200. The magnetic storage medium 200 includes an etched magnetic layer 202 that includes a plurality of magnetic regions 116 and non-magnetic regions 114. The magnetic storage medium 200 also includes a stop layer 204, a lubrication layer 206 and a substrate 208. The illustrated structures are exemplary only and may not all be included in all embodiments and/or may vary between embodiments. Note that FIG. 2 is a schematic diagram and may not represent the actual physical structure and/or shape or physical structure of the components. One of skill in the art will recognize that the actual structure may vary depending on fabrication methods, imperfections, types of materials, design variations, etc.

In the depicted embodiment, the magnetic regions 116 are laterally adjacent the non-magnetic regions 114. As used herein the terms "lateral" or "laterally" are given to indicate a direction substantially parallel to a planar surface of the magnetic storage medium 200. In one embodiment, the non-magnetic regions 114 at least partially separate adjacent magnetic regions 116. As discussed above, each of the magnetic regions 116 may be used to store data by maintaining its magnetic materials (e.g., grains) in a certain magnetic orientation that can later be read or altered by a read/write head 106. In one embodiment, the magnetic region 116 may include a hard magnetic material particularly conducive to maintaining its magnetic orientation such that it creates a static magnetic field that may be read. The magnetic region 116 may be highly magnetic and have a high magnetic moment density such that the magnetic orientation of the magnetic region may be more easily read.

The magnetic regions 116 may be formed of any magnetic material known in the art. Exemplary magnetic materials may include materials containing elements selected from cobalt (Co), chromium (Cr), and platinum (Pt). In one embodiment, the magnetic regions 116 may include a single layer of material. In one embodiment, multiple layers of different materials having different chemical compositions may be used. In one embodiment, the composition of the magnetic regions 116 may vary in a vertical dimension. For example, the magnetic regions 116 may include a bi-layer of two different magnetic compositions. In another embodiment, the magnetic regions 116 may be built up from a multi-layer stack consisting of layers such as cobalt and palladium or cobalt and platinum. Other embodiments may include magnetic regions formed from iron (Fe) and platinum (Pt). One of skill in the art will recognize significant variation in the possible chemical compositions and structures of the magnetic regions 116.

In one embodiment, the non-magnetic regions 114 are formed within grooves 404 of the etched magnetic layer 202. The non-magnetic regions 114 may laterally separate the magnetic regions 116. In one embodiment, the non-magnetic regions 114 are formed of a fill layer that has been deposited within grooves 404 separating the magnetic regions 116. The non-magnetic regions 114 may be substantially non-magnetic such that they interact only very weakly with magnetic fields or not at all. In one embodiment, the non-magnetic regions 114 may separate each magnetic region 116 from other magnetic regions 116. In one embodiment, the non-magnetic regions 114 may make it easier to read an orientation of a magnetic region 116. For example, if a non-magnetic region 114 is substantially non-magnetic, there may be a reduced amount of noise detected by a read/write head 106 when the head is over the non-magnetic region 114. This may make it easier for a controller module 112 to identify the magnetic regions 116 and/or their orientation when passed over by a read/write head 106.

In one embodiment, the non-magnetic regions 114 may be formed of any material that does not interact or only weakly interacts with magnetic fields. In one embodiment, the non-magnetic regions 114 are made from alumina ($Al_2O_3$). In other embodiments, the non-magnetic regions 114 may be made from another material, such as, for example, a material that includes aluminum and oxygen. For example, the non-magnetic regions may be made from a material that has the composition $AlO_x$, where x is in the range of 1 to 2. In another embodiment, the non-magnetic regions 114 may be made from a material that includes titanium and nitrogen, tantalum and nitrogen, or tantalum and titanium and nitrogen, or the like. For example, the non-magnetic regions 114 may be made from titanium nitride (TiN), tantalum nitride (TaN), TiTaN, a combination thereof, or the like. In one embodiment, the non-magnetic regions 114 (fill layer) are made from a material having a composition $TiN_x$, where x is in the range of 0.5 and 1.5. In one embodiment, the non-magnetic regions 114 (fill layer) are made from a material having a composition $TaN_x$, where x is in the range of 0.5 and 1.5. In one embodiment the non-magnetic regions 114 (fill layer) are made from a material having a composition $(TiTa_y)N_x$, where x is in the range of 0.5 and 1.5 and y is in the range of 0 and 1.0.

In one embodiment, the stop layer 204 is at least partially located between the magnetic regions 116 and the non-magnetic regions 114. In one embodiment, the stop layer 204 lines the sidewall surfaces and base surfaces of the grooves 404 of the magnetic layer 202. In one embodiment, the stop layer 204 substantially separates the fill layer of the non-magnetic regions 114 from the magnetic regions 116. In one embodiment, the stop layer 204 completely separates the magnetic regions 116 from the non-magnetic regions 116. In one embodiment, the stop layer 204 extends over the magnetic regions 116 and forms a boundary between underlying layers and overlying layers. Underlying layers may be any layers deposited underneath or prior to the stop layer while overlying layers may be any layers deposited on top of or after the stop layer. In one embodiment, the stop layer 204 is a substantially uniform (e.g., homogenous) layer. For example, the stop layer 204 can be formed within a single deposition step to form a single layer. In other words, in some implementations, the stop layer 204 does not include multiple layers formed by separate or intervening deposition and/or etching steps. Further, the thickness of the stop layer 204 can be substantially the same across the medium. In another embodiment, the stop layer thickness can be thicker near the outer diameter (OD) and thinner in the middle or inner regions of the disk. In yet another embodiment, the stop layer thickness can be thicker near the inner diameter (ID) and thinner in the middle and outer regions of the disk.

In one embodiment, the stop layer 204 is formed of a physically hard material to facilitate planarization during fabrication. For example, the stop layer 204 may be formed to stop or slow etching of the surface of the magnetic storage medium 200 during a chemical mechanical planarization. This may allow a surface of the magnetic storage medium 200 to be smoother and more planar. The stop layer 204 may also help seal the material of the medium below the stop layer 204 from outside materials. For example, the stop layer 204 may seal out moisture or other contaminants. Additionally, the stop layer may reduce or prevent chemicals in the planarizing slurry from reaching to the magnetic layer during the CMP planarization processing. Additionally, the stop layer 204 may act as a protective layer for lower layers or material within the magnetic storage medium 200. For example, according to one embodiment, the stop layer 204 protects the underlying magnetic regions 116 from damage due to impact with a read/write head 106.

In one embodiment, the stop layer 204 facilitates bonding between adjacent layers. For example, the stop layer 204 may bond well with the magnetic regions 116, substrate 208, non-magnetic regions 114, and/or lubrication layer 206. In one embodiment, the stop layer 204 may bond better to one or more of the contacted layers and thus facilitated bonding and longevity for the magnetic storage medium 200. For example, in one embodiment a particular lubrication material used in the lubrication layer 206 may bond or stick better to the stop layer 204 than to the magnetic region 116 or non-magnetic region 114.

A variety of materials may be used for the stop layer 204. In one embodiment, the stop layer 204 is made from carbon or a carbon compound. For example, the stop layer 204 can be made from a hardened carbon material. The composition of the stop layer may vary thru the thickness of the stop layer. In one specific implementation, the top of the stop layer 204 is made from a nitrogenated carbon for facilitating bonding with the lubrication layer 206. The stop layer may also be formed of other materials such as silicon nitride (SiN), silicon carbide (SiC), boron nitride (BN), boron carbide (BC), or other hard materials. In one embodiment, the magnetic regions 116 may serve as a stop layer. For example, by using a magnetic material that is not corroded during an etching process and/or placing the magnetic storage medium 200 in a corrosion-free environment within a disk drive (such as a helium filled disk drive) the magnetic regions 116 may serve as a stop layer 204. In one embodiment, this may allow a lubrication layer 206 to be placed directly on top of the magnetic regions 116. In one embodiment, a top of the fill layer is no more than 2 nm above a top of the stop layer and no more than 6 nm below the top of the stop layer. In a further embodiment, a top of the fill layer is no more than 1 nm above a top of the stop layer and no more than 4 nm below the top of the stop layer.

The lubrication layer 206 may be a low friction layer to facilitate improving triobology such as protecting the disk surface from when portions of the read/write head 106 come in contact with the magnetic storage medium 200. For example, the slider may hit the magnetic storage medium during drive operation when the write head is pushed closer to the disk to calibrate the spacing between the read/write head 106 and the disk for minimizing and controlling magnetic spacing. Other examples include shock events such as when a disk drive is accelerated to the point that the read/write head 106 can be forced to the disk surface. The lubrication layer 206 may help minimize damage to the disk during these events. For example, during an event in which the read/write head 106 comes in contact with or hits the magnetic storage medium 200 the lubrication layer 206 may allow the read/write head 106 to slide on the surface of the lubrication layer 206 rather than penetrating into the surface of the storage medium 200 and damaging underlying layers. Exemplary materials used for lubrication may include fluorocarbon-based Z-dol, ZTMD, Z-Tetraol, or the like.

In one embodiment, the magnetic storage medium 200 is configured such that there is a minimal distance between the magnetic regions 116 and a flying read/write head 106. In one embodiment, one aspect of minimizing this distance includes minimizing the distance between the lubrication layer 206 and the magnetic regions 116. In one embodiment, the stop layer 204 is formed having a minimal thickness. In one embodiment, the stop layer 204 has a thickness of about 3 nanometers (nm) or less. According to one particular implementation, the stop layer 204 has a thickness of about 2.5 nanometers (nm) or less. In yet another embodiment, the stop layer 204 has a thickness of about 2 nm or less.

The substrate 208 may be a non-magnetic material that supports the magnetic storage medium 200. The substrate may be made from any of various materials, such as, for example aluminum, aluminum alloys, polymers, Mylar, paper, glass, glass composites, magnesium alloys, ceramics, silicon, silicon wafers coated with one or more material layers, or other materials commonly used in the art. In certain implementations, the substrate 208 is a flexible tape substrate. In other implementations, the substrate 208 is a hard disk substrate. The substrate may be made from glass or aluminum and be formed in the shape of a disk with the diameter of the disk larger than the thickness of the disk and with a hole missing from the center of the disk. In the case of a substrate used for a semiconductor device or memory the substrate may start out as a disk shaped wafer and then eventually be diced into a rectangular shape.

Although FIG. 2 shows magnetic regions 116 directly on the substrate 208, in some embodiments, the medium may include one or more underlayers disposed on the substrate 208 between the magnetic regions 116 and the substrate 210. In one embodiment, for example, the recording medium 200 may include a soft underlayer between the substrate and magnetic regions 116. The soft underlayer may be made from a material that is magnetically softer (lower coercivity) than a magnetic region 202. In one embodiment, the soft underlayer may be made from Co, NiFe or any other suitable alloys such as CoPtCr, or the like, which are well known in the art.

In one embodiment, the soft under layer increases the available write flux and field gradients for the write process. That is, a soft underlayer may increase the possible field strength and field gradient of a write field that may be used in a write process. Higher field strengths and higher field gradients enable writing sharper magnetic transitions and may be needed or desired for magnetically reversing smaller sized magnetic bits (such as magnetic regions 116 in bit-patterned media) that are thermally stable. A soft underlayer may also be useful to help reduce the affects of adjacent track interference (ATI) during a read and/or write process.

The dimensions and structure of the magnetic storage medium 200 is for illustrative purposes only. Variations in the thicknesses of layers, shapes of layers, or other aspects may vary between embodiments. The thin film layers may not be atomically smooth, but rather can have a roughness associated with the variation in height of the top surface. This could be the case for the magnetic, stop and/or fill layers. In one embodiment, the magnetic regions 116 may have a thickness in the range of about 4 nm to about 20 nm. In another embodiment, the magnetic regions 116 may have a thickness in the range of about 5 nm to 8 nm. In one embodiment, the stop layer 204 is made as thin as possible to limit the distance between a top of the magnetic storage medium 200 and the magnetic regions 116. In one embodiment, the stop layer 204 may have a thickness of about 30 angstroms or less. In one embodiment, the stop layer 204 may have a thickness of about 25 angstroms or less. In one embodiment, the stop layer 204 may have a thickness in the range of about 5 angstroms to about 30 angstroms. According to one embodiment, one or more additional layers may be included. For example, the magnetic storage medium 200 may include an overcoat layer, one or more underlayers, or any other layers.

In one embodiment, the structure and dimensions of the various layers and materials of the magnetic storage medium 200 may be configured to minimize a distance between a surface of the magnetic storage medium 200 and a the magnetic regions 116. Minimizing the distance between a surface of the magnetic storage medium 200 and the magnetic regions 116 may allow for better read and write performance because it may allow a read/write head 106 to be positioned closer to the magnetic regions 116. In one embodiment, for example, a distance 210 between the magnetic regions 116 and the lubrication layer 206 may be minimized. In one embodiment, the distance 210 between the magnetic regions 116 and the lubrication layer 206 may be about 3 nanometers (nm) or less. In another embodiment, the distance 210 may be about 2 nm or less. In another embodiment, the distance 210 may be about 1 nm or less. In yet another embodiment, the distance 210 may be about 0 nm. For example, a lubrication layer 206 may be deposited substantially directly on the magnetic layer 116.

Furthermore, the combination of materials used may also vary. In one embodiment, for example, the stop layer 204 is made from carbon, such as a diamond-like carbon that is hydrogenated, and the non-magnetic regions 114 are made from alumina ($Al_2O_3$). In one embodiment, the stop layer 204 is made from carbon and the non-magnetic regions 114 are made from titanium nitride (TiN) or tantalum nitride (TaN). The stop layer 204 in the above embodiments may be formed of another material such as silicon carbide (SiC), silicon nitride (SiN), boron nitride (BN), boron carbide (BC), or other hard and dense materials.

Figure 3:
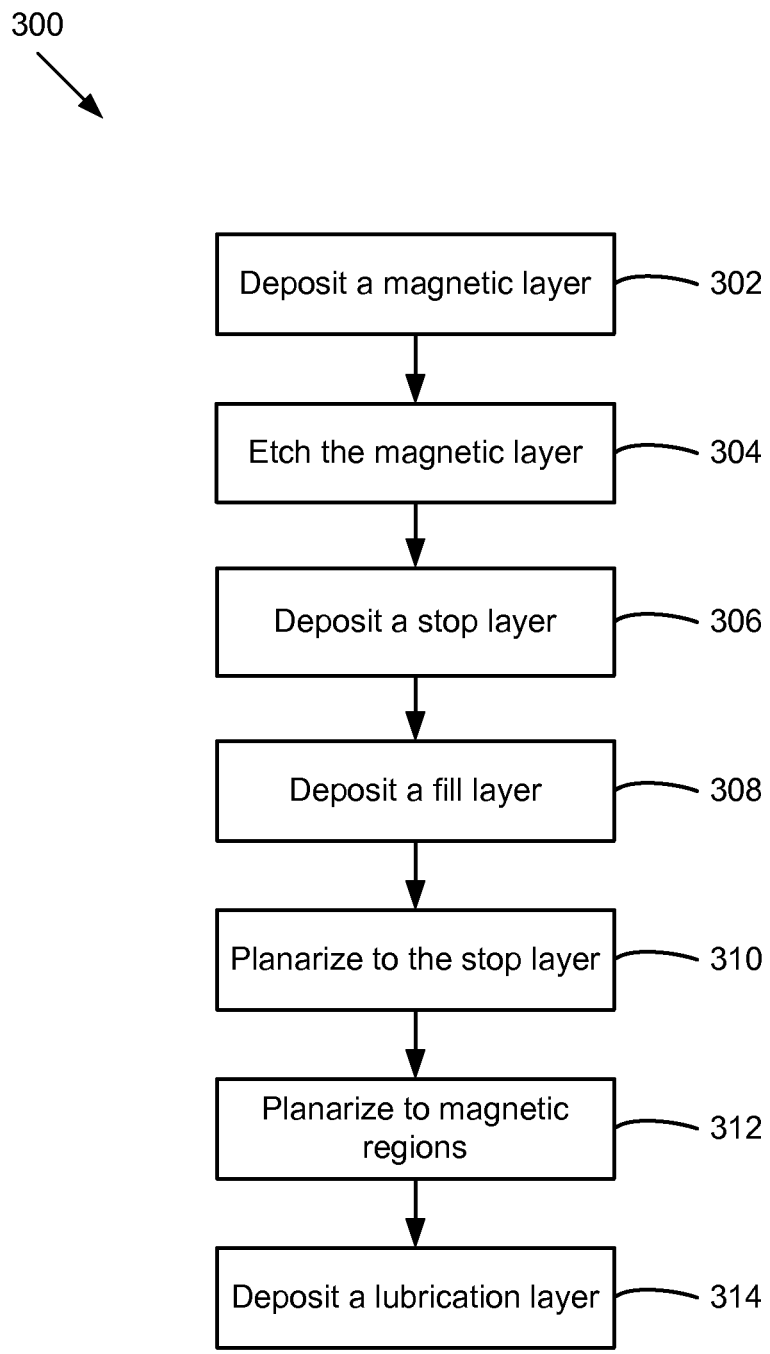
FIG. 3 is a flow chart diagram illustrating a method for fabricating a magnetic storage medium according to one embodiment.

FIG. 3 is a schematic flow chart diagram illustrating one embodiment of a method 300 for fabricating a magnetic storage medium 200. The method 300 may be used, for example, to form the magnetic storage medium 200 of FIG. 2. The steps 302-316 of the method are exemplary only and may not be included in all embodiments. Any combination of the steps 302-316 may be included in various embodiments. In one embodiment, for example, only steps 306-310 may be included. Exemplary operation of the method 300 will be illustrated in relation to FIGS. 4A-4I.

In the illustrated embodiment, the method 300 includes depositing 302 a magnetic layer 202. The magnetic layer may be deposited 302 on top of a substrate 208 or an underlayer. In one embodiment, the underlayer may be a magnetically soft underlayer, a magnetically hard underlayer, or any other type of underlayer. The magnetic layer may be deposited using any various deposition techniques known in the art. For example, the magnetic layer may be deposited using chemical vapor deposition, sputter deposition, or any other thin film fabrication methods known in the art.

Figure 4A:
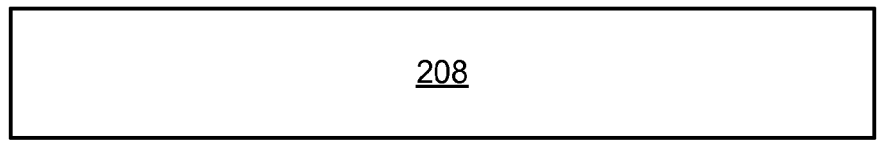
FIG. 4A is a schematic cross-sectional side view of a substrate according to one embodiment.
Figure 4B:
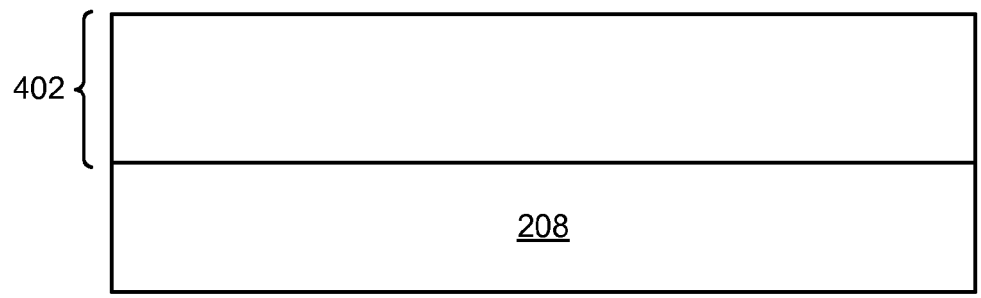
FIG. 4B is a schematic cross-sectional side view of a magnetic layer deposited on a substrate according to one embodiment.

FIG. 4A illustrates a substrate 208 and FIG. 4B illustrates the substrate 208 with a magnetic layer 402 deposited 302 thereon. The substrate 208 depicted is exemplary only and does not necessarily reflect an actual substrate thickness in relation to the magnetic layer 402. For example, substrates will generally be extremely thick in comparison to thin film magnetic layers or other features of a thin film recording medium. Thus, one of skill in the art will recognize that the thickness of the illustrate substrate 208 can vary considerably and should not be understood as limiting.

Figure 4C:
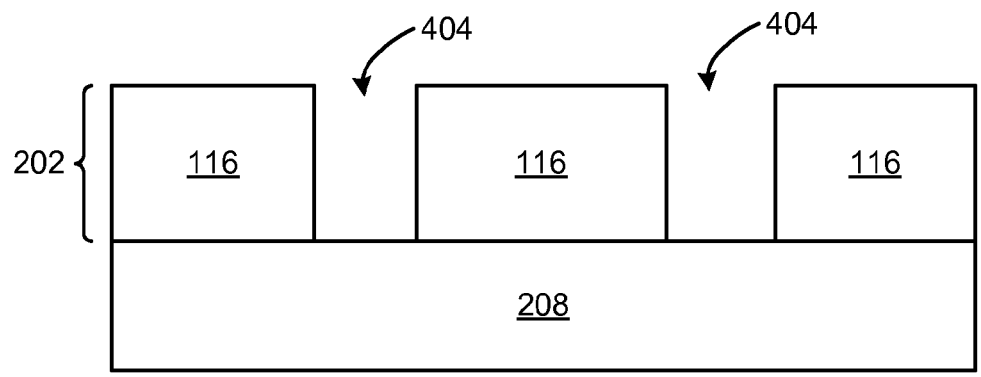
FIG. 4C is a schematic cross-sectional side view of an etched magnetic layer according to one embodiment.

The method 300 includes etching 304 the magnetic layer 402 to form an etched magnetic layer 202. FIG. 4C illustrates an etched magnetic layer 202 on the substrate 208 after the magnetic layer 402 of FIG. 4B has been etched 304. The etched magnetic layer 202 includes grooves 404 that extend into the etched magnetic layer 202. The grooves 404 are located between magnetic regions 116. In one embodiment, the magnetic regions 116 separated by the grooves 404 will be used as storage elements. In the depicted embodiment, the grooves 404 extend to the underlying substrate layer 208. In other embodiments, the grooves 404 may extend only partway through the etched magnetic layer 202 or may extend through the etched magnetic layer 202 and into an underlayer, such as partially into the substrate 208.

The magnetic layer 402 may be etched 304 using any various deposition techniques known in the art. For example, the magnetic layer 402 may be etched 304 using any etch technique known in the art. In one embodiment, the magnetic layer 402 may be etched using a dry etching technique. Examples of dry etching include ion beam etching, sputter etching, and the like. In one embodiment, etching 304 may include the fabrication of one or more masks and etching the underlying magnetic layer 402. One of skill in the art will recognize extensive variations that may take place during etching 304 that falls within the scope of the present disclosure.

The method 300 includes depositing 306 a stop layer 204. In one embodiment, depositing 306 the stop layer 204 is done in response to etching 304 to form the etched magnetic layer 202. In one embodiment, the stop layer is deposited on an etched magnetic layer 202 that includes one or more grooves 404. In one embodiment, depositing 306 the stop layer 204 is done prior to any deposition within grooves 404 formed in the magnetic layer 202. For example, the stop layer 204 may include the first material deposited within the grooves 404.

Figure 4D:
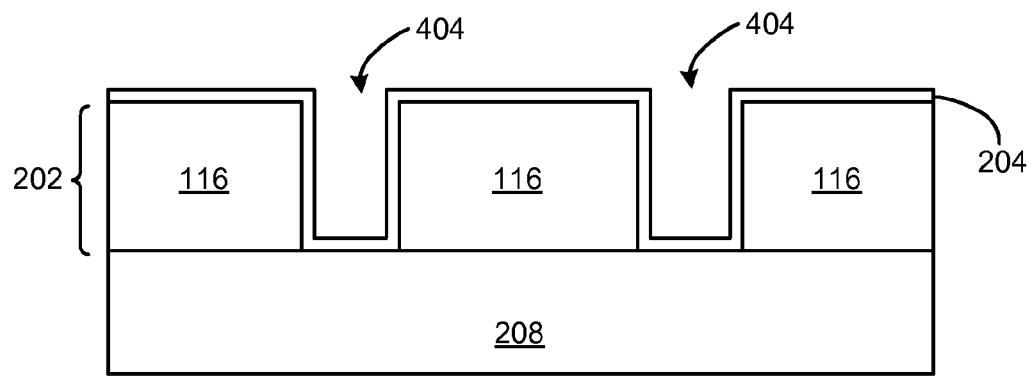
FIG. 4D is a schematic cross-sectional side view of a stop layer deposited on an etched magnetic layer according to one embodiment.

FIG. 4D illustrates a stop layer 204 that has been deposited on the etched magnetic layer 202 of FIG. 4C. In the depicted embodiment, the stop layer 204 extends over the magnetic regions 116 and down the sides and across the base surface of the grooves 404. In one embodiment, the stop layer 204 forms a uniform layer that extends over the etched magnetic layer 202 and any underlying layers exposed during the etching 304 of the magnetic layer 402. The stop layer 204 may be deposited 306 using any of various deposition techniques known in the art. In one embodiment, the stop layer 204 may be deposited using a vacuum-based deposition technique such as sputter deposition, facing target-sputtering, or cathodic arc deposition For example, the stop layer 204 may be deposited 306 using chemical vapor deposition, sputter deposition, or any other thin film fabrication methods known in the art. In one embodiment, a variety of factors may affect which deposition technique is used such as the material to be deposited, the needed deposition speed, and/or temperature requirements. In some situations, sputter deposition may be lower cost, reliable, flexible in the allowable temperature ranges, and leverage tooling infrastructure that is more widely available than for other deposition techniques. One of skill in the art will recognize other factors which may affect the desirability of a specific deposition technique.

According to one embodiment, a material may be directed at the etched magnetic layer 202 at a range of angles such that the sidewalls, the base and the land are all coated simultaneously. According to one embodiment, a material may be directed at the etched magnetic layer 202 at an angle such that the sidewall surfaces of the grooves 404 are coated. According to one embodiment, a material may be deposited in a first direction and then in a second direction. The first direction may be configured to deposit material on a first sidewall surface of a groove while a second direction may be configured to deposit material on a second sidewall surface of a groove.

The method 300 includes depositing 308 a fill layer. In one embodiment, the fill layer is deposited 308 in response to the deposition 306 of the stop layer 204. For example, the fill layer maybe deposed 308 later in time than the stop layer 204. In one embodiment, the fill layer is deposited 308 directly on top of the stop layer 204. The fill layer may be deposited 308 such that it is at least partially deposited within the grooves 404 of the etched magnetic layer 202. In one embodiment, a portion of the fill layer is deposited 308 between the magnetic regions 116 to form non-magnetic regions 114. In one embodiment, the fill layer is deposited 308 on the land at the same time fill material is also deposited above a magnetic region 116.

Figure 4E:
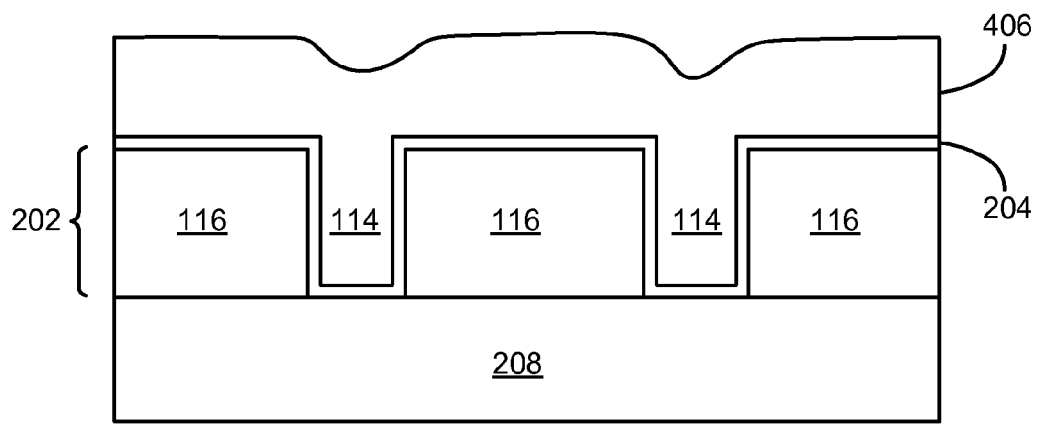
FIG. 4E is a schematic cross-sectional side view of a fill layer deposited on a stop layer according to one embodiment.

FIG. 4E illustrates a fill layer 406 that has been deposited 308 on the stop layer 204. In the depicted embodiment, the fill layer 406 extends into the grooves 404 to form non-magnetic regions 114 between the magnetic regions 116. In the depicted embodiment, the non-magnetic regions 114 are completely separated from the magnetic regions 116 by the stop layer 204. In the depicted embodiment, the fill layer 406 extends above the stop layer 204 and the magnetic regions 116. The fill layer 406 may be deposited 308 using any of various deposition techniques known in the art. For example, the fill layer 406 may be deposited 308 using sputter deposition, ion-beam deposition, evaporation, spin-coating, chemical vapor deposition, or any other thin film fabrication methods known in the art.

The method 300 includes planarizing 310 to the stop layer 204. In one embodiment, planarizing 310 includes removing a portion of material to create a planar surface. For example, the material of the fill layer 406 that is vertically higher than the stop layer 204 may be removed in a planarization 310. In one embodiment, planarizing 310 to the stop layer 204 includes removing substantially all of the fill layer 406 located above the upper edge of the stop layer 204. In one embodiment, planarizing to the stop layer 204 may remove substantially all of the filler material from above the magnetic regions 116. In one embodiment, planarizing the fill layer comprises removing substantially all the fill layer 406 that lies 2 nm or more above the stop layer 204. In another embodiment, planarizing the fill layer comprises removing substantially all the fill layer 406 that lies 1 nm or more above the top of the stop layer 204.

Figure 4F:
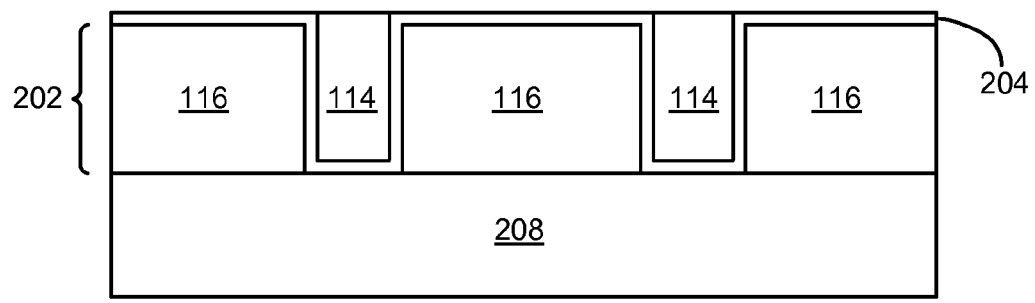
FIG. 4F is a schematic cross-sectional side view of a fill layer that has been planarized to a stop layer according to one embodiment.

Planarizing 310 to the stop layer 204 may be done using any material removal or etching techniques known in the art. In one embodiment, the planarizing 310 to the stop layer 204 includes performing a chemical mechanical planarization (CMP). In one embodiment, CMP includes the use of chemical etching combined with abrasion to remove and smooth a surface. In one embodiment, a chemical slurry may be selected for selective etching of material. For example, a chemical slurry for removing the fill layer 204 but not the stop layer 204 may be used in some embodiments. This may help to ensure that during CMP the stop layer 204 is not removed. This may allow for the creation of an extremely flat and smooth surface. FIG. 4F illustrates the surface of the stop layer 204 and non-magnetic regions 114 after the fill layer 406 has been planarized 310 down to the stop layer 204. In one embodiment, planarizing 310 to the stop layer 204 may result in a portion of the filler material within the non-magnetic regions 114 being removed. This may result in dips being formed along the surface of the stop layer 204 and non-magnetic regions 114.

Figure 4G:
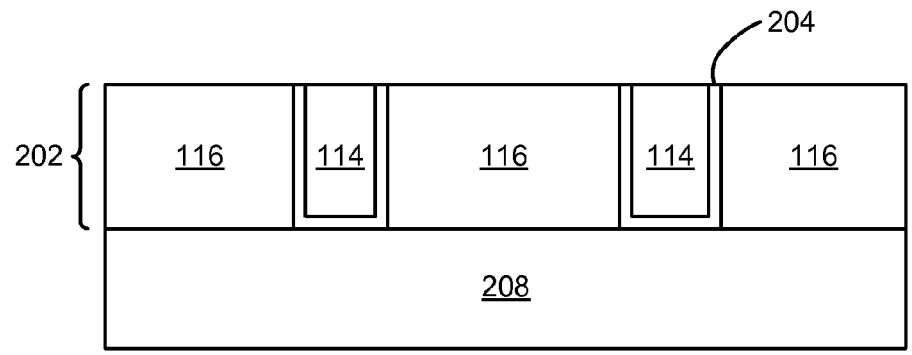
FIG. 4G is a schematic cross-sectional side view of a stop layer that has been planarized down to a magnetic layer according to one embodiment.

The method 300 may also include planarizing 312 to the magnetic regions 116. In one embodiment, planarizing 312 to the magnetic regions includes planarizing or removing a portion of the stop layer 204 that overlies the magnetic regions 116. In one embodiment, planarizing includes a CMP step using a slurry that selects for the stop layer and not the non-magnetic regions 114 or the magnetic regions 116. FIG. 4G illustrates the exposed magnetic regions 116 after the stop layer 204 has been removed. In one embodiment, the slurry used to CMP the stop layer is different than the slurry used to CMP the fill layer. In some embodiments, the step of planarizing 312 a portion of the stop layer 204 may not be included. For example, the stop layer 204 may remain substantially intact following one or more planarization steps. For example, a finished structure for a magnetic recording medium 200 may include a substantially uniform and intact stop layer 204.

Figure 4H:
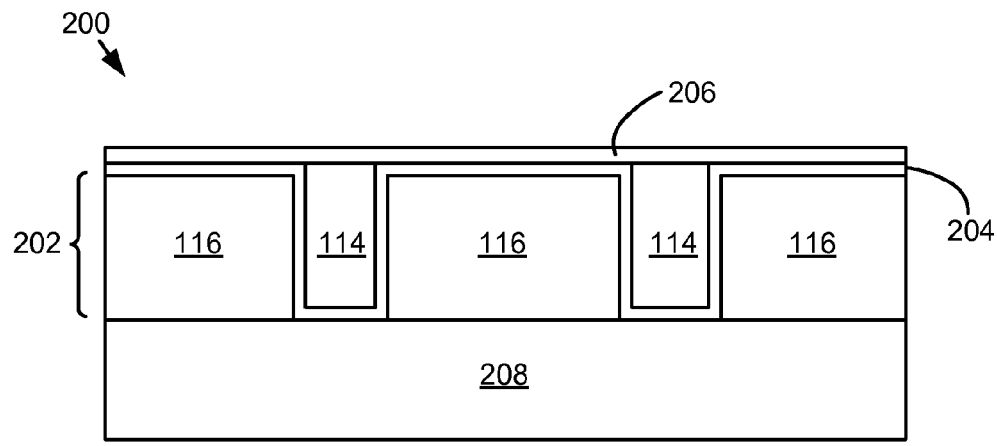
FIG. 4H is a schematic cross-sectional side view of a lubrication layer deposited on a stop layer and a fill layer according to one embodiment.
Figure 4I:
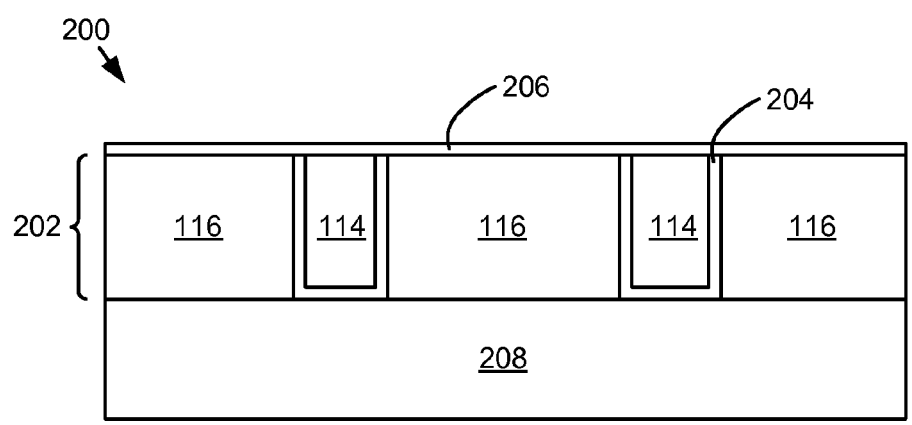
FIG. 4I is a schematic cross-sectional side view of a lubrication layer deposited on a magnetic layer according to one embodiment.

The method 300 may include depositing 314 a lubrication layer 206. The lubrication layer 206 may be deposited 314 using any available deposition techniques known in the art. For example, the lubrication layer 206 may be deposited 314 using dip-coating or spin-coating or any other thin liquid coating methods known in the art. FIG. 4H illustrates a magnetic storage medium 200 where a lubrication layer 206 has been deposited 314 without planarizing 312 to the magnetic regions 116. In other words, the stop layer 204 still extends over the magnetic regions 116 and has not been removed. For example, the lubrication layer 206 has been deposited substantially directly on the stop layer 204 and non-magnetic regions 114 of FIG. 4F. FIG. 4I illustrates a magnetic storage medium 200 where a lubrication layer 206 has been deposited 314 after planarizing 312 to the magnetic regions 116. In other words, the stop layer 204 no longer extends over the magnetic regions 116 and has been removed. For example, the lubrication layer 206 has been deposited 314 substantially directly on the stop layer 204, magnetic regions 116, and non-magnetic regions 114 of FIG. 4G.

The method 300 of FIG. 3 illustrates one exemplary method for forming a magnetic storage layer 200. It is important to note that one or more steps may be omitted or added, in some embodiments.

In one embodiment, the etching process or steps performed within the method 300 may be ion-based etch process. For example, etching of the magnetic layer 402 may be done using a vacuum etch such as a sputter etch or ion-beam etch. As a further example, planarizing 310, 312 of one or more layers may be done using chemical mechanical planarization (CMP).

The method 300 may allow for a reduced number of steps or processing procedures to fabricate or manufacture a magnetic storage medium 200 while maintaining high quality. For example, the deposition of a stop layer 204 that is not completely removed may allow for the stop layer to not only facilitate planarization but also to perform a protective layer such that deposition of protective overcoat may be omitted. Additionally, the stop layer 204 may allow for better adherence to a lubrication layer 206 while maintaining a small distance between a magnetic region 116 and the lubrication layer 206.

Figure 5:
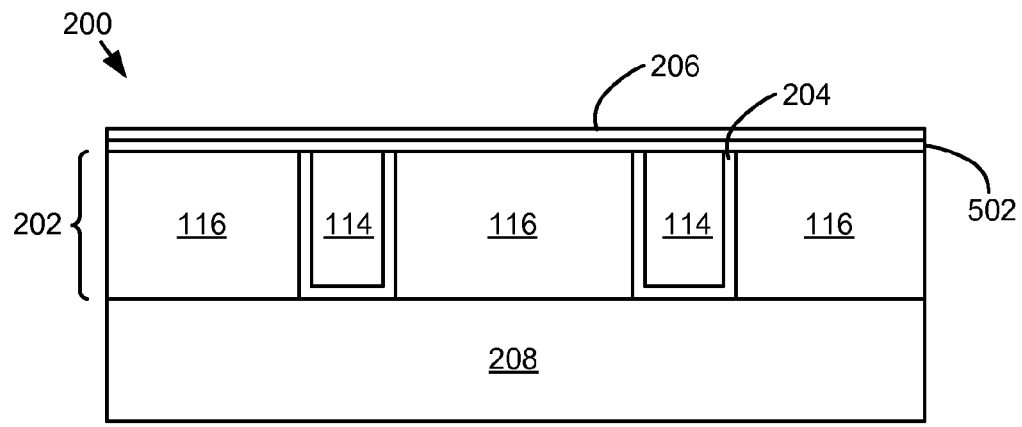
FIG. 5 is a schematic cross-sectional side view of a patterned magnetic storage medium having an overcoat layer according to one embodiment.
Figure 6:
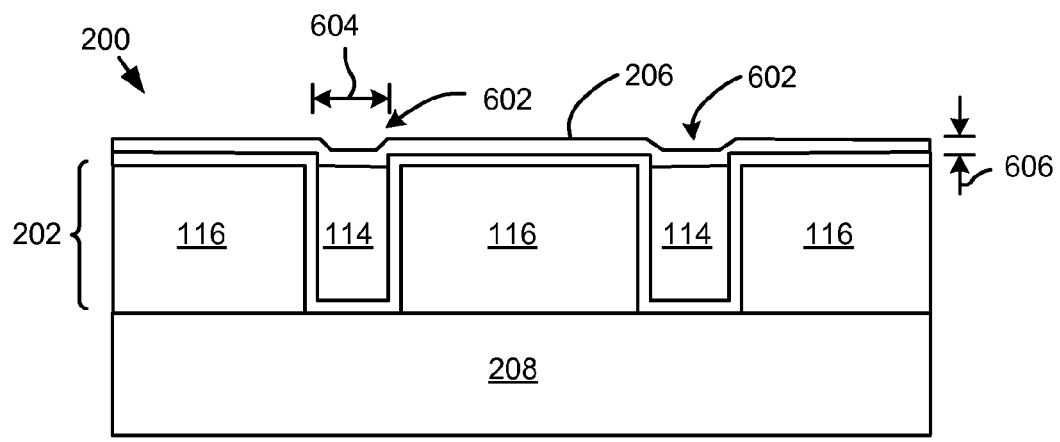
FIG. 6 is a schematic cross-sectional side view illustrating dips in a patterned magnetic storage medium according to one embodiment.

According to one embodiment, FIGS. 2, 4G, and 4I all illustrate exemplary embodiments of a magnetic storage medium 200. FIGS. 5 and 6 illustrate further embodiments of magnetic storage media 200 with exemplary variations. FIG. 5 is a schematic diagram illustrating a cross-sectional structure of one embodiment of a magnetic storage medium 200 having an overcoat layer 502. In one embodiment, the overcoat layer 502 is formed of a physically hard material and forms a protective layer over the underlying magnetic regions 116 and other layers. In one embodiment, the overcoat layer 502 may be desirable when the stop layer 204 above the magnetic regions 116 has been removed.

FIG. 6 is a schematic diagram illustrating a cross-sectional structure of one embodiment of a magnetic storage medium 200 and showing dips 602 which may result in some embodiments. According to one embodiment, the dips 602 may be formed as a result of using method 302 in forming a magnetic storage medium 200. For example, the a planarization of the fill layer 406 (depicted in FIG. 4E) may result in a removal of a portion of the fill layer 406 within the grooves 404. Deposition of a lubrication layer 206 may then result in dips 602 remaining.

According to one embodiment, the dips 602 may reduce the smoothness or planarity of the magnetic storage medium 200 and may have a detrimental effect on read/write head 106 flying height. For example, the height at which the read/write head 106 is required to fly to reduce risk of contact with the magnetic storage medium 200 due to the dips 602 may decrease the performance of a storage device in which the magnetic storage medium 200 is used. However, the size of the dips 602 may be significantly smaller than features found in other bit-patterned media. For example, the dips may have a width 604 of 10 nm or less. In some embodiments, the dips 602 may have a width 604 of 5 nm or less. In one embodiment, the dips 602 may have a depth 606 of 5 nm or less. In one embodiment, the dips 602 have a depth 606 of about 3 nm or less. In another embodiment, the dips 602 have a depth 606 of about 2 nm or less.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A patterned medium comprising:
    a patterned layer comprising a plurality of grooves;
    a stop layer disposed on the patterned layer, the stop layer at least partially disposed within the plurality of grooves, a portion of the stop layer disposed on walls of the grooves of the patterned layer; and
    a fill layer at least partially disposed within the grooves between portions of the stop layer, the stop layer substantially separating the fill layer from the patterned layer;
    wherein the patterned layer comprises a plurality of magnetic regions laterally adjacent the plurality of grooves and wherein the fill layer forms a plurality of non-magnetic regions laterally adjacent the magnetic regions, the medium further comprising a lubrication layer disposed on the stop layer.

2. The patterned medium of claim 1, wherein the stop layer is disposed on top of the magnetic regions and laterally between the magnetic regions and the non-magnetic regions.

3. The patterned medium of claim 1, wherein the stop layer substantially forms a barrier between the magnetic layer and any subsequent layers.

4. The patterned medium of claim 1, wherein the distance between the magnetic regions and the lubrication layer is in the range of about 0 nm to about 3 nm.

5. The patterned medium of claim 1, wherein the distance between the top of the patterned layer and the lubrication layer is in the range of about 0 nm to about 1 nm.

6. The patterned medium of claim 1, wherein the lubricant is deposited substantially directly on top of the magnetic regions and the fill layer.

7. The patterned medium of claim 1, where a top of the fill layer is no more than 2 nm above a top of the stop layer and no more than 6 nm below the top of the stop layer.

8. The patterned medium of claim 1, where a top of the fill layer is no more than 1 nm above a top of the stop layer and no more than 4 nm below the top of the stop layer.

9. The patterned medium of claim 1, wherein the stop layer comprises a single layer extending over substantially the entire surface of the patterned layer.

10. The patterned medium of claim 1, wherein the fill layer is made from a material comprising aluminum and oxygen.

11. The patterned medium of claim 10, wherein the material of the fill layer comprises AlOx, where x is in the range of between about 1 and about 2.

12. The patterned medium of claim 1, wherein the fill layer is made from a material comprising titanium and nitrogen.

13. The patterned medium of claim 1, wherein the fill layer is made from a material comprising tantalum and nitrogen.

14. The patterned medium of claim 1, wherein the fill layer is made from a material comprising titanium, tantalum, and nitrogen.

15. A patterned medium comprising:
    a patterned layer comprising a plurality of grooves, wherein the patterned layer comprises a plurality of magnetic regions laterally adjacent the plurality of grooves;
    a stop layer disposed on the patterned layer, the stop layer at least partially disposed within the plurality of grooves, a portion of the stop layer disposed on walls of the grooves of the patterned layer;
    a fill layer at least partially disposed within the grooves between portions of the stop layer, wherein the fill layer forms a plurality of non-magnetic regions laterally adjacent the magnetic regions, the stop layer substantially separating the fill layer from the patterned layer, wherein the fill layer is made from one of,
a material comprising titanium and nitrogen,
a material comprising tantalum and nitrogen, or
a material comprising titanium, tantalum, and nitrogen;
and a lubrication layer disposed on the stop layer.

* * * * *